United States Patent [19]

Nishijima et al.

[11] Patent Number: 4,964,238
[45] Date of Patent: Oct. 23, 1990

[54] AUTOMOTIVE WINDOW REGULATOR

[75] Inventors: Hirotaka Nishijima, Yokohama City; Satoru Ugawa, Hadano City, both of Japan

[73] Assignees: Nissan Motor Co., Ltd.; Ohi Seisakusho Co., Ltd., both Yokohama City, Japan

[21] Appl. No.: 342,141

[22] Filed: Apr. 24, 1989

Related U.S. Application Data

[63] Continuation of Ser. No. 106,963, Oct. 13, 1987, abandoned, which is a continuation of Ser. No. 745,176, Jun. 17, 1985, abandoned.

[30] Foreign Application Priority Data

Jun. 18, 1984 [JP] Japan .................................. 59-123677

[51] Int. Cl.⁵ ............................................. E05F 11/48
[52] U.S. Cl. .......................................... 49/352; 49/349; 49/360
[58] Field of Search .................. 49/352, 360, 349, 227

[56] References Cited

U.S. PATENT DOCUMENTS

| 1,989,964 | 2/1935 | Beckler | 49/352 X |
| 3,022,064 | 2/1962 | Russell | 49/352 X |
| 3,174,742 | 3/1965 | Stelzer | 49/349 |
| 3,449,861 | 6/1969 | LeComte | 49/349 |
| 4,182,078 | 1/1980 | Bartholomew | 49/349 X |
| 4,420,906 | 12/1983 | Pickles | 49/352 |
| 4,441,276 | 4/1984 | Chikaraishi | 49/352 |
| 4,691,475 | 9/1987 | Maekawa | 49/349 X |

FOREIGN PATENT DOCUMENTS

| 2382630 | 11/1978 | France | 49/352 |
| 573125 | 11/1945 | United Kingdom | 49/352 |

Primary Examiner—Philip C. Kannan
Attorney, Agent, or Firm—Foley & Lardner, Schwartz, Jeffery, Schwaab, Mack, Blumenthal & Evans

[57] ABSTRACT

A guide plate has at the front and rear ends thereof a pair of guide rail portions on which a pair of sliders are movably mounted for guiding movement of a door glass. The guide plate also mounts thereon a drive unit for driving the door glass at a point located between the sliders.

8 Claims, 2 Drawing Sheets

AUTOMOTIVE WINDOW REGULATOR

This application is a continuing application of Ser. No. 07/106,963, filed Oct. 13, 1987, now abandoned, which is a continuing application of Ser. No. 06/745,176, filed June 17, 1985, now abandoned.

BACKGROUND OF THE INVENTION

1. Field of the Invention

The present invention relates in general to automotive vehicle doors and more particularly to a window regulator for raising and lowering a door glass or window pane.

2. Description of the Prior Art

A prior art window regulator as is disclosed in the Japanese Utility Model Publication No. 57-4697, includes a pair of front and rear guide rails arranged nearly vertically and attached to a door panel, a pair of guide rollers rotatably mounted on a door glass and movably received in the guide rails so that the door glass is movable upwardly and downwardly being guided by the guide rails, and an X-arm type drive unit by which the door glass is driven to move upwardly and downwardly.

In the prior art window regulator, the guide rails and the drive unit are formed as independent constituent parts or assemblies and separately mounted on a door panel by separate fastening means. Due to this, installation of the window regulator requires not only a difficult installation work but a delicate adjusting work, otherwise the door glass does not move smoothly.

SUMMARY OF THE INVENTION

A window regulator according to the present invention exclusively supports and guides a door glass and comprises a guide plate having a pair of parallel opposite ends on which a pair of sliders are mounted in a manner to be movable upwardly and downwardly being guided by the opposite ends. The sliders are in turn fixedly attached to a window pane. A drive unit is mounted on the guide plate for driving the window pane at a point located between the sliders.

The above structure is effective for solving the above noted problems inherent in the prior art device.

It is accordingly an object of the present invention to provide a window regulator for an automotive vehicle door which can effect smooth movement of a window pane without requiring a delicate and difficult adjusting work.

It is another object of the present invention to provide a window regulator of the above mentioned character which can be installed with an easy installation work.

BRIEF DESCRIPTION OF THE DRAWINGS

The features and advantages of the automotive window regulator according to the present invention will become more clearly appreciated from the following description taken in conjunction with the accompanying drawings in which.

DETAILED DESCRIPTION OF THE PREFERRED EMBODIMENT

Figure 1:
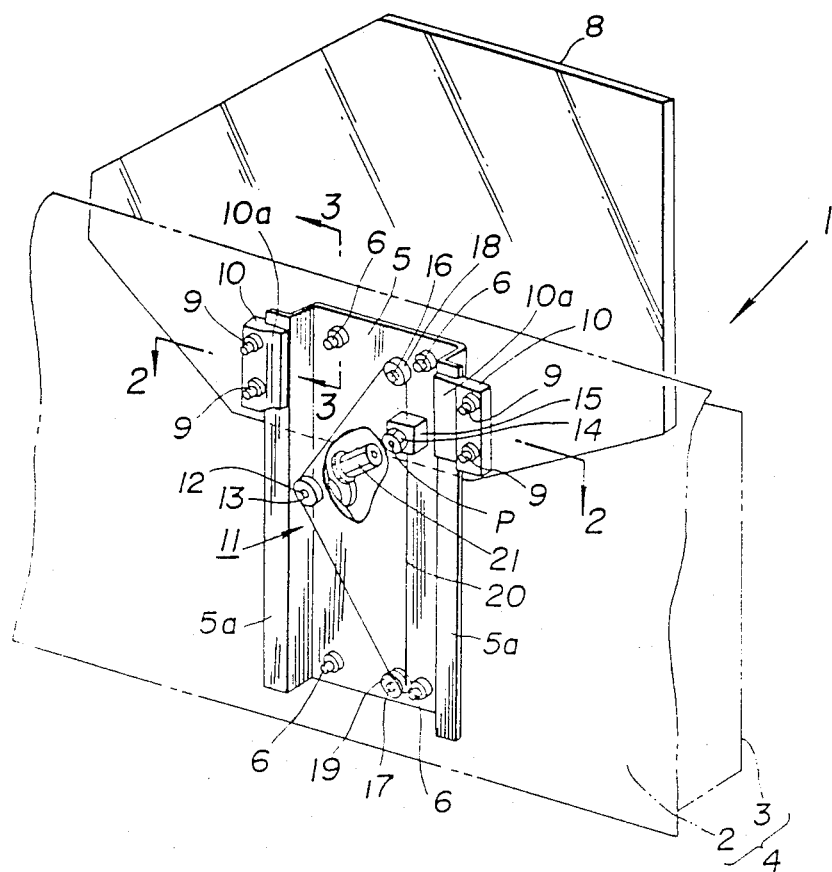
FIG. 1 is a perspective, partly cutaway view of an automotive vehicle door incorporating a window regulator according to the present invention.
Figure 2:
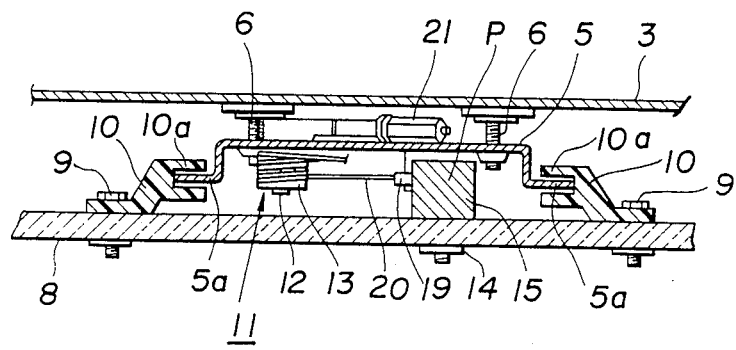
FIG. 2 is a sectional view taken along the line X—X of FIG. 1.
Figure 3:
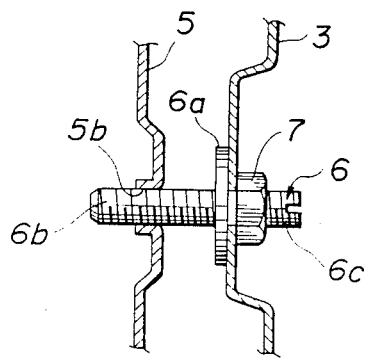
FIG. 3 is an enlarged sectional view taken along the line Y—Y of FIG. 1.

Referring to the drawings, generally indicated by the reference numeral 1 is an automotive vehicle door including an outer panel 2 and an inner panel 3 which are joined together to form a hollow door body 4. The inner panel 3 is formed with various access holes (not shown) which are used for assembly works, as is well known in the art.

Within the door body 4 a guide plate 5 is disposed vertically or in parallel to the inner panel 3 and fastened at the upper and lower ends thereof to the inner panel 3 by means of a plurality of adjusting bolts 6.

Each adjusting bolt 6 is adapted to be screwed at an end portion 6b thereof into a corresponding threaded hole 5b of the guide plate 5 and has a base portion 6c projecting outward of the door body 4. Each adjusting bolt 6 also has at a location between the end portion 6b and the base portion 6c a flange 6a which cooperates with a nut 7 screwed onto the base portion 6c to clamp therebetween the inner panel 3, whereby to support the guide plate 5 on the inner panel 3 in a way to provide a predetermined space therebetween. The space or distance between the inner panel 3 and the guide plate 5 can be easily adjusted by first loosening the nut 7 to permit rotation of the bolt 6 into a desired position and then tightening again the nut 7 to lock the bolt 7 at the desired position.

The guide plate 5 is rectangular and has at the forward and rearward ends thereof a pair of guide rail portions 5a of an L-shaped cross section, i.e., the guide rail portions 5a are formed by bending the forward and rearwards ends in such a manner that the ends first extend toward the outer panel 2 and then forwardly outward and rearwardly outward, respectively.

On the guide rail portions 5a there are movably mounted a pair of sliders 10 which are in turn fixedly attached to the lower end portion of a door glass or window pane 8 by bolts and nuts 9. More specifically, each slider 10 is rectangular in configuration and has a bifurcated end portion 10a straddling part of the guide rail portion 5a so that the slider 10 is movable upwardly and downwardly being guided by the guide rail portion 5a.

With the above arrangement in which the sliders 10 are adapted to be movable upwardly and downwardly on the guide rail portions 5a of the guide plate 5, the door glass 8 is movable smoothly at any time through a slit (not shown) defined between the outer panel 2 and the inner panel 3.

A drive unit is generally indicated by the reference numeral 11 and shown in this embodiment as of the wire type adapted to drive the door glass 8 at a point P located between the sliders 10. More specifically, the drive unit 11 consists of a drive shaft 12 journalled on the guide plate 5 at a place intermediate between the upper and lower ends thereof, a winding drum 13 mounted on the drive shaft 12 to rotate therewith and located on the side of the guide plate 5 nearer to the outer panel 2, a movable bracket 15 fixedly attached by a bolt and nut 14 to the door glass 8 at the point P thereon, a pair of driven shafts 16, 17 journalled on the guide plate 5 at the places adjacent the upper and lower ends thereof, a pair of pulleys 18, 19 mounted on the driven shafts 16, 17 to rotate therewith and located on the side of the guide plate 5 nearer to the outer panel 2, a wire 20 having a portion fixedly attached to the movable bracket 15 and placed around the pulleys 18, 19 and the winding drum 13 in a manner to have opposite end portions which are respectively wound around the winding drum 13 in the reverse directions, and an electric motor 21 installed on the guide plate 5 on the side thereof nearer to the inner panel 3 and adapted to drive the drive shaft 12 through a reduction gear not shown) in one and the other directions.

When a power window switch (not shown) set adjacent a driver's seat is operated, the electric motor 21 is energized and drives through the drive shaft 12 the winding drum 13 to rotate in the clockwise direction or in the counterclockwise direction in FIG. 1. By this, the upper side portion or the lower side portion of the wire 20 is wound up by the winding drum 13 to cause the point P on the door glass 8 to move upwardly and downwardly.

In the meantime, it is desirable to set the point P at the place right under the center of gravity of the door glass 8 or at the place as close as possible to same.

In the above, it is to be understood that in the case where the door glass 8 which is vertically curved is used, the guide plate 5 as well as the door panels 2, 3 is correspondingly curved vertically.

While a preferred embodiment has been described and shown in detail hereinabove, the present invention is not limited to it. For example, the electric motor 21 may be replaced by a manual drive means for manually rotating the winding drum 13 by means of, for example, a regulator handle.

Further, the wire type drive unit 11 may be replaced by a different drive unit such as for example of the type including a rack and pinion or of the type including a pinion and a flexible, power-transmitting cable, i.e. a so-called geared cable.

From the foregoing, it is to be understood that installation of the window regulator according to the present invention can be attained with an easy installation work and does not require a delicate adjusting work since the guide plate 5 is formed at the front and rear ends thereof with the guide rail portions 5a for guiding movement of the door glass 8 and at the same time adapted to mount thereon the drive unit 11. As such, the door glass or window pane is supported and guided exclusively by the window regulator.

It is further to be understood that smooth movement of the door glass 8 can be assuredly attained since the door glass 8 is adapted to be driven at the point P located between the sliders 11 and furthermore the positional relation between the center of gravity of the door glass 8, the sliders 10 and the point P of action is held constant.

It is yet further to be understood that adjustment of the drive unit 11 for attaining smooth movement of the door glass 8 can be attained with ease since the adjustment can be done prior to installation of the window regulator on the door 1.

It is yet further to be understood that by setting the point P at a place right under the center of gravity of the door glass 8 or as close as possible, to same, not only movement of the door glass 8 can be smoother but also a whistling sound resulting from leaking air due to distortion of the door glass 8 when a negative pressure acts on the door glass 8 can be prevented.

What is claimed is:

1. A window regulator positionable in a vehicle for independently raising and lowering a window pane, the window regulator providing the exclusive support and guidance for the window pane, comprising:

a guide plate fixedly attachable to the vehicle and having a pair of generally parallel, substantially vertical ends;

a pair of sliders, each slider being fixedly attachable to the window pane and slidably securable to a respective vertical end of the guide plate; and drive means attached to the guide plate and connected to the window pane at a point between the sliders so as to be operable to directly drive the window pane for raising and lowering the pane while the pane is being guided by the sliders sliding along the vertical ends of the guide plate.

2. A window regulator as claimed in claim 1, wherein the drive means comprises a bracket secured to the window pane at said point which substantially corresponds to a point right under the center of gravity of the window pane.

3. A window regulator as claimed in claim 1, wherein the guide plate is rectangular in shape.

4. A window regulator as claimed in claim 1, wherein the vertical ends of the guide plate each comprise a guide rail portion having an L-shaped cross section and each of the sliders has a bifurcated end portion for straddling a respective vertical end of the guide plate.

5. A window regulator as claimed in claim 1, wherein the drive unit comprises a winding drum journalled on the guide plate at a location intermediate upper and lower ends of the guide plate, a separate pulley journalled on the guide plate at respective upper and lower ends thereof, a movable bracket fixedly attached to the window pane, a wire having a portion fixedly attached to the movable bracket and means for rotating the winding drum.

6. A window regulator as claimed in claim 5, wherein the drive means further comprises an electric motor.

7. A window regulator positionable in a vehicle having no means for guiding a window pane, the window regulator for independently raising and lowering a window pane, comprising:

a guide plate fixedly attachable to the vehicle and having a pair of generally parallel, substantially vertical ends;

a pair of sliders, each slider being fixedly attachable to the window pane and slidably securable to a respective vertical end of the guide plate; and drive means attached to the guide plate and connected to the window pane at a point between the sliders so as to be operable to directly drive the window pane for raising and lowering the pane while the pane is being guided by the sliders sliding along the vertical ends of the guide plate.

8. An apparatus for a vehicle, comprising in combination:

a window pane;

a door attachable to the vehicle, the door having no structure for guiding the window pane as the window pane is raised or lowered relative to the door; and a window regulator comprising:

a guide plate fixedly attachable to the door and having a pair of generally parallel, substantially vertical ends;

a pair of sliders, each slider being fixedly attachable to the window pane, and slidably securable to a respective vertical end of the guide plate; and drive means attached to the guide plate and connected to the window pane at a point between the sliders so as to be operable to directly drive the window pane for raising and lowering the pane while the pane is being guided by the sliders sliding along the vertical ends of the guide plate.

* * * * *